United States Patent
Stuhrmann

(10) Patent No.: US 10,030,874 B2
(45) Date of Patent: Jul. 24, 2018

(54) HOME APPLIANCE AND METHOD OF FASTENING A HOME APPLIANCE

(71) Applicant: Miele & Cie. KG, Gütersloh (DE)

(72) Inventor: Sascha Stuhrmann, Oelde (DE)

(73) Assignee: Miele & Cie. KG, Gütersloh (DE)

( * ) Notice: Subject to any disclaimer, the term of this patent is extended or adjusted under 35 U.S.C. 154(b) by 261 days.

(21) Appl. No.: 14/993,143

(22) Filed: Jan. 12, 2016

(65) Prior Publication Data

US 2016/0201922 A1   Jul. 14, 2016

(30) Foreign Application Priority Data

Jan. 14, 2015   (DE) ......................... 10 2015 100 484

(51) Int. Cl.
| | | |
|---|---|---|
| *F16M 11/00* | (2006.01) |
| *F24C 15/08* | (2006.01) |
| *A47B 91/00* | (2006.01) |
| *A47B 91/08* | (2006.01) |
| *A47B 96/00* | (2006.01) |
| *F16M 13/02* | (2006.01) |

(52) U.S. Cl.
CPC ............ *F24C 15/08* (2013.01); *A47B 91/005* (2013.01); *A47B 91/08* (2013.01); *A47B 96/00* (2013.01); *F16M 13/02* (2013.01); *F24C 15/083* (2013.01)

(58) Field of Classification Search
CPC ........ F16M 11/24; F16M 11/28; F16M 11/22; F16M 11/16
USPC ....... 248/188, 188.1, 188.2, 188.4, 500, 680
See application file for complete search history.

(56) References Cited

U.S. PATENT DOCUMENTS

| | | | |
|---|---|---|---|
| 5,176,437 A | 1/1993 | Remington | |
| 5,624,098 A * | 4/1997 | McDowell | F24C 3/12 |
| | | | 248/188.8 |
| 2003/0010886 A1* | 1/2003 | Barnes | A47L 15/427 |
| | | | 248/680 |
| 2006/0102815 A1* | 5/2006 | Erdmann | A47L 15/4253 |
| | | | 248/188.2 |
| 2009/0001246 A1* | 1/2009 | Phillips | A47L 15/4253 |
| | | | 248/680 |
| 2011/0050064 A1* | 3/2011 | Phillips | A47B 91/002 |
| | | | 312/351.3 |

(Continued)

FOREIGN PATENT DOCUMENTS

| | | |
|---|---|---|
| DE | 60132049 T2 | 12/2008 |
| FR | 2251227 A5 | 6/1975 |
| WO | 2009/002632 A1 | 12/2008 |

*Primary Examiner* — Steven M Marsh
(74) *Attorney, Agent, or Firm* — Brinks Gilson & Lione

(57) ABSTRACT

A household appliance (1) has a housing (2), a treatment chamber (3), a door (4), and a securing device (5). The securing device (5) includes a first fastening device with a first holding element (10) in the bottom section (8) of the housing (2), and a second fastening device (7) including a second holding element (11), which can essentially be firmly connected to an installation location (12) of the housing (2). The first (6) and the second (7) fastening device are suitable for and configured to establish an operative connection to each other by coupling the first (10) and the second holding element (11). A holding device (9) associated with the first fastening device (6) on the housing (2) includes a guide (23) for guiding the first fastening device (6) into operative connection with the second fastening device (7) even after positioning the household appliance in the installation location.

19 Claims, 3 Drawing Sheets

(56) References Cited

U.S. PATENT DOCUMENTS

2013/0313385 A1\* 11/2013 Mora ................. F16M 7/00
                                                    248/188.4

\* cited by examiner

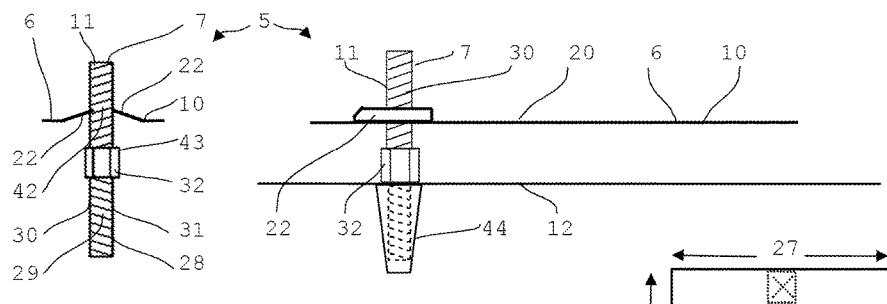
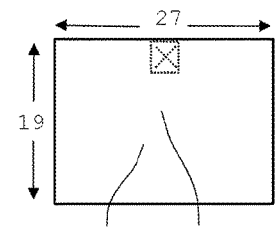
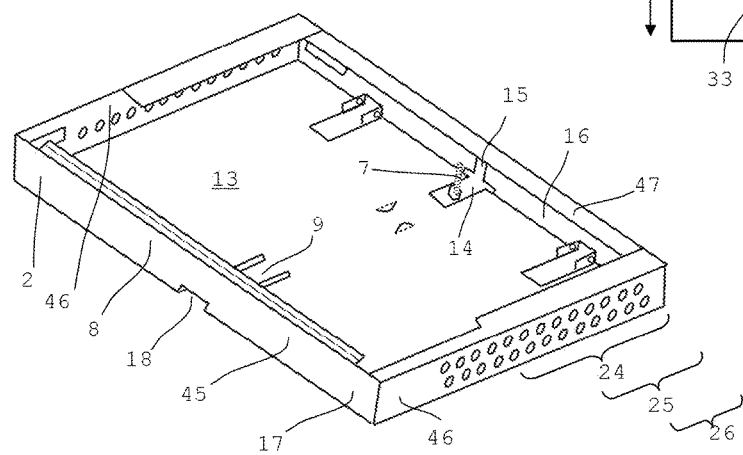
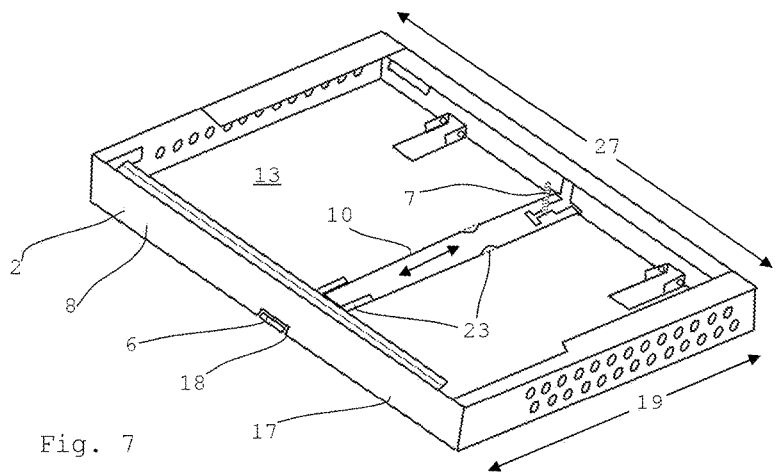

HOME APPLIANCE AND METHOD OF FASTENING A HOME APPLIANCE

TECHNICAL FIELD

The present application relates to a household appliance and in particular a cooking device. This household appliance has at least one housing and at least one securing arrangement. The application also relates to a method of fastening a household appliance.

BACKGROUND

As a rule, household appliances are relatively heavy and therefore are quite secure in the position they were placed. Many household appliances, however, have a treatment chamber which can be closed off by means of a door. By way of example, such a door is attached to most cooking devices such that it is opened about a horizontal axis and represents an essentially horizontal surface in the opened state.

Under unfavorable circumstances, such an open door can act as a kind of lever so that the household appliance can tilt or even tip over in the worst case. By way of example, this lever effect can occur, for example, if a child climbs onto the open door, or, for example, if a heavy piece of food is temporarily placed on the open door. In such cases, the household appliance can start a tilting motion because of the weight of the child or of the piece of food. Apart from that, a household appliance can also tilt or tip over if a user holds on to it and the user himself tips over backward or falls.

In particular, in the case of household appliances which have a treatment chamber that can be closed off by means of a door, the otherwise secure position of the household appliance alone may, under certain circumstances, not be sufficient owing only to the weight of the household appliance.

It is advisable to reduce the risk of the household appliance tilting or tipping over because it could result in a risk of injury. In order to prevent the household appliance from tilting, the back of the household appliance may be screwed onto the wall of the installation location. In case a wall is at all available behind the household appliance, such fastening, however, is usually visible and thus not desired by a user. A fastening starting, for example, in the front at the legs of the household appliance is frequently unreliable because such fastening to the front of the household appliance cannot provide an adequate support against the arising lever forces.

Devices for a tilt-proof connection of a household appliance to its installation location are known from DE 601 32 049 T2, U.S. Pat. No. 5,176,437 A, WO 2009/002632 A1, and from FR 2 251 227 A5. What these tilting protections have in common is that the holding element on the side of the household appliance is already connected to the holding element on the side of the installation location prior to the connection to the household appliance. In this way, the household appliance must be pushed onto the holding element at the installation location. In the case of heavy household appliances, positioning them securely is not always easy; if need be, the holding element must even be readjusted at the installation location.

SUMMARY

It is therefore the object of the present invention to provide a household appliance, in particular a cooking device, and a method to adjust the same, with which a simple fixation can be accomplished.

The household appliance according to the present invention may be conceived as a cooking device and has a housing, on which at least one treatment chamber is disposed. The treatment chamber can be closed off by at least one door. Furthermore, at least one securing device is provided, wherein the securing device comprises at least one first fastening device and at least one second fastening device. The first fastening device is disposed in the bottom section of the housing and has at least one first holding element. The second fastening device can be firmly connected to the installation location, on which the household appliance or the housing thereof can be positioned, and comprises at least one second holding element. The first and second fastening device is furthermore suitable and configured to establish an operative connection with one another by coupling the first and the second holding element.

According to the present invention, at least one insertion device for the first fastening device is provided in the bottom section of the housing, in particular on the bottom of the housing, of the household appliance. As a result a separate producing and later installation of the securing device on the housing is made possible. At least one guide for the first fastening device is also provided on the holding device. Such a guide can, for example, be made available by at least one mounting bracket or web, which can be attached or disposed, e.g. on the bottom of the housing of the cooking device. The first fastening device can advantageously be movably held in the holding device and thus only be moved in predetermined directions and in particular only over a limited distance. The first fastening device particularly preferably has at least one projection and/or at least one recess, which interacts with the holding device and in particular with the guide, in order to determine the direction of movement and/or the movement distance. The first fastening device is thus advantageously movably but also captively accommodated movable on the housing of the household appliance. Owing to the configuration according to the present invention, it is achieved that the first fastening device is introducible into the housing or mountable onto the housing and can be brought into operative connection with the second fastening device even after the final positioning of the household appliance at its installation location. Furthermore, the first fastening device can also be removed again through this opening.

At least one opening can be provided in the bottom section of the front wall of the housing of the household appliance, through which opening the first fastening device is introducible into the housing of the household appliance.

It is also possible and advantageous that the first fastening device is introduced into the bottom section of the housing in a mounting step and that it can no longer be removed from the outside afterward. An opening in the bottom section of the front wall of the housing of the household appliance can then in particular be provided to make the first fastening device accessible such that the producing of an operative connection between the first and the second fastening device is also possible after the final positioning of the household device at its installation location, in particular by moving the first fastening device relative to the housing of the device.

The household appliance according to the present invention provides many advantages. A significant advantage is that a household appliance configured in this way is reliable and in particular can be fixed at the installation location in a tilt-proof manner. The outer appearance of the household appliance is essentially not affected thereby.

In this respect, the operative connection between the first and the second fastening device can be realized by a coupling of the first and the second holding element, in particular by clamping, latching, hooking, bracing, screwing, engaging, or the like.

At least one opening is preferably provided, for example, in the bottom section of the housing and/or in the region of the rear wall of the housing. The opening is, in this case, in particular associated with the second fastening device. The second fastening device mounted at the installation location, in particular on the floor of the installation location, can enter or engage in the housing in order to accomplish the operative connection with the first fastening device. In this way, a tilt-proof connection between the first and the second fastening device can be produced. In particular, the at least one second holding element of the second fastening device can interact with the at least one holding element of the first fastening device and preferentially be coupled to one another.

The outer appearance of the household appliance is in particular not influenced if, according to an especially preferred embodiment, the at least one inlet opening is provided in the bottom section of the housing or of the bottom part of the housing. As a result, the securing device of the housing of the household appliance is covered when the household appliance is in the operative position at the installation location.

The housing preferably has two openings, the first of which is located in the bottom section of the housing and the second in the region of the rear wall of the housing. These at least two inlet openings are particularly preferably at least partly or at least sectionally connected to one another and form a joint inlet opening in the region of the edge between the bottom of the housing and the rear wall of the housing. The second fastening device fixed onto the floor at the installation location can then pass into the inlet opening in the rear wall and thus reach into the inlet opening in the bottom of the housing, in particular when the household appliance is simply pushed into the desired position from the front side, i.e., with the rear wall of the housing in the direction of the second fastening device, in particular of the second holding element, until it is pushed into the desired position at the installation location and achieves operative connection with the first fastening device.

The opening in the rear wall of the housing can preferably also be available only temporarily. This can, for example, be accomplished in that the opening in the rear wall of the housing is again closed off in the final position of the household appliance. In other designs the inlet opening can also, for example, be made available by a kind of flap, which swings open on contact with the second fastening device and automatically closes again after the second fastening device has passed.

The bottom section of the front wall of the housing can preferably be covered with a panel which covers the opening and/or the first fastening device. At least one first holding device is then provided in the bottom section on of the front wall of the housing, which first holding device interacts with at least one second holding device provided on the panel in order to hold the panel on the front wall of the housing. It is particularly preferably provided that the panel is only attached to the front wall of the housing when the first fastening device has been introduced into the housing of the household appliance and in particular pushed in so far that it no longer protrudes through the front wall. Advantageously the panel can consequently only be mounted when the first and second mounting device are in operative connection with each other.

In preferred designs, at least one first holding element of at least one first fastening device at least sectionally rests on the bottom of the housing of the household appliance in the installed state. In this way it is ensured that the clamping element is essentially guided and guided at a preferred angle towards the second fastening device so that it can subsequently be brought into operative connection with the second fastening device.

Here it is particularly advantageous that at least one first fastening device extends over a significant part of the depth of the bottom of the housing, wherein "depth of the bottom of the housing" is understood as the distance between the front wall and the opposite rear wall of the housing of the household appliance.

In especially preferred designs at least one first holding element comprises at least one clamping element, in particular a clamping plate. In this case, the clamping plate in particular is comprised of at least one metal-plate strip. Due to such a design a holding element can be produced in a simple, cost-effective, and variable manner.

It is furthermore preferred that at least one first holding element has at least one projection, in particular a tab. Such a projection serves in particular as a kind of abutment for the second fastening device. The first fastening device having the projection is thus brought into connection with the second fastening device such that the housing of the household appliance can no longer be moved freely, but at best only to a limited extent relative to the second fastening device.

In appropriate further developments, at least one projection, in particular a tab, of the first holding element is directed essentially upward, in particular slightly upward, in the installed state of the holding element. As a result an especially effective connection between the first and the second fastening device can be accomplished. In particular, when the first holding element is configured as a clamping element, the upward arrangement of the tab results in an effective clamping effect of the first fastening device against the second fastening device. The particularly slightly upward arrangement of the tab on the first holding element can, for example, in a manufacturing by stamping, be achieved using a stamping process which produces the at least one tab. Other processes can of course also be used in order to produce the at least one tab and/or the first holding element. It is, for example, also possible to laser-cut, saw or mill such a tab. A kind of slot can, of course, also be introduced into the first holding element, onto which slot prefabricated tabs are fixed. They can, for example, be glued or welded thereon.

An essential advantage of the at least one tab oriented slightly upward on the first holding element of the first fastening device, which first holding element is embodied as a clamping element, is that under load the clamping element is connected even more firmly to the second holding element. With an essentially downward orientation of the at least one tab on the first holding element, it could happen that under load the holding element simply slides off the second fastening device.

In especially preferred embodiments, the first and second fastening device are arranged on or relative to the housing such that the coupling point, that is the point, at which the operative connection of the first fastening device to the second fastening device can be established, is situated in the region of the rear half, preferably of the rear third, and especially preferably of the rear quarter of the bottom of the housing of the household appliance. It is in particular preferred that the coupling point is positioned close to the rear wall of the housing of the household appliance. By positioning the coupling point close to the rear wall of the housing of the household appliance it is achieved that the force acting on the household appliance, in particular in the region of the front wall of the housing, which is, for example, generated by an opened and possibly also additionally loaded door of the cooking chamber acts as a favorable lever as possible on the first and second fastening device. An especially secure state of the household appliance can thus be ensured.

It is also preferred that the securing device is essentially provided at half-width of the housing. The second fastening device is, for example, in the coupled state then arranged in the center and as far back as possible in the housing of the household appliance. Owing to the approximately central position of the securing device, an especially favorable lever is accomplished in case of force acting on the household appliance, especially if only one securing device is used. A plurality of securing devices can, of course, also be provided on the cooking device. By way of example, with the arrangement of two securing devices, a positioning of each securing device as far on the outer side as possible on the width of the housing of the household device can be provided.

In order to ensure an especially reliable connection of the first to the second fastening device it is preferred that the second fastening device is fixated on or on the floor of the installation location, and that the at least one holding element is spaced apart from the floor after the fixation of the second fastening device, such that it can enter the housing through an inlet opening on the housing of the household appliance and establish an operative connection with the first fastening device, in particular with its first holding element, wherein the operative connection is provided in particular by latching or engaging one fastening device with the other fastening device.

Advantageously, the second fastening device and/or the second holding element is embodied as a rod having at least one locking device or as a threaded rod, wherein preferably at least one section of the thread acts as a second holding element. A nut screwed onto the threaded road can also serve as a holding element and in particular as an additional holding element. But also the design as a screw with a screw head as a second holding element can be advantageous. Furthermore, the second mounting device can be realized as a screw hook, wherein the segment angled off the shaft forms the second holding element. In particular, a screw aid is also provided on the second fastening device.

By using locking devices on a rod, or owing to the presence of a thread, the tabs of the clamping element can, for example, engage in the first locking element or the thread when coupling the first fastening device with the second fastening device. As a result, the clamping element can on the one hand be especially effectively clamped with the second fastening device. Furthermore, realizing an essentially stepless mounting of the clamping element on the second fastening device is possible using such an embodiment. Depending on the position of the clamping element relative to the second fastening device, the tabs of the clamping element engage in a higher or lower thread of the second fastening device or in a higher or lower locking device. An optimum connection between the first and the second fastening device can thus essentially always be made possible. This is especially advantageous if a height-adjustment device is provided in the bottom section of the housing, using which the household appliance can be adjusted at a certain height and/or using which irregularities of the floor can be compensated at the installation location.

In order to define the desired position for the second fastening device on the floor, at least one template, which can be attached to the household appliance, is provided in advantageous further developments. Such a template can, e.g. consist of paper or cardboard and represent an image of the bottom housing, wherein the template is then placed on the later desired position of the household appliance in the installation location. The template shows the recommended mounting location of the at least one second fastening device on the floor of the installation location relative to the desired position of the household appliance. It is thus easily possible to fasten the second fastening device to the provided location on or in the floor of the installation location.

In a preferred further development, the second fastening device comprises a fastening unit, which makes possible, or at least facilitates, the fixation of the fastening device on the floor and/or on a wall of the desired installation location. The at least one second holding element is in this case disposed on the fastening unit such that, after the fixation of the second fastening device, it is spaced apart from the floor such that the second holding element can enter the housing through an inlet opening on the housing of the household appliance and accomplish an operative connection to the first fastening device, in particular to its first holding element. The mounting unit can be configured as a metal-plate strip or as a metal-plate angle on which the at least one second holding element and at least one through-opening is disposed. The second mounting unit can then, for example, be fixated as need be using a screw introduced through the through-opening of the fastening unit on the floor and/or on a wall of the installation location. Alternatively or in addition to said screw, another fastening means, which is suitable for the respective nature of the floor or of the wall of the desired installation location, can, of course, also be selected.

The method according to the present invention is suitable for fastening a household appliance in a tilt-proof manner. Here the household appliance is in particular designed as a cooking device, and it is in particular fastened to the installation location and preferably to the floor of the installation location. The household appliance has at least one housing and at least one securing device, wherein the securing device comprises at least one first fastening device and at least one second fastening device. The first and the second fastening device are suitable and configured to establish a connection to each other.

With the method according to the present invention the second fastening device is fastened to a location predefined by means of a template at the installation location, and in particular on the floor of the installation location. The household appliance is placed in the desired installation location, whereby the second fastening device at least partly engages and/or enters the housing of the household device through an opening in the housing body and/or in the rear wall of the housing. A first fastening device is moved in the bottom section of the housing relative to the second fastening device until accomplishing a coupling between a first holding element of the first fastening device and a second holding element of the second fastening device, and the first fastening device and the second fastening device establish an operative connection to each other. In this case, the first fastening device is in particular pushed into the housing such that the first fastening device and in particular, the first holding element of the first fastening device is pushed onto the second fastening device and in particular onto the second holding element of the second fastening device. In this way, a tilt-proof connection between the first and the second fastening device can be established.

The method according to the present invention for a tilt-proof fastening of a household appliance also provides many advantages. A significant advantage is that the method makes it possible to accommodate a household appliance on the floor without causing an adverse visual effect. The only part of the securing device that can be seen is the opening in the bottom section of the housing, through which the first fastening device is pushed into the housing. This small opening is not significantly disturbing and can also be concealed by a cover.

Further advantages and features of the invention will be apparent from the exemplary embodiment, which will hereinafter be explained with reference to the accompanying drawings. The drawings are provided for purely illustrative purposes and are not intended to limit the scope of the present invention.

BRIEF DESCRIPTION OF THE DRAWINGS

In the attached drawings,

FIG. 4 shows a frontal highly schematic depiction of a clamping element, which is pushed onto a second fastening device;

FIG. 5 shows a lateral highly schematic depiction of a clamping element which is pushed onto a second fastening device, wherein the second fastening device is fastened to the floor.

FIG. 6 shows a highly schematic depiction of the bottom section of a housing of a household appliance according to the present invention, wherein a second fastening device engages in the housing;

FIG. 7 shows the depiction according to FIG. 6 with the inserted first fastening device;

FIG. 8 shows a schematic depiction of a template to determine the fastening point of the second fastening device;

DETAILED DESCRIPTION OF THE DRAWINGS

In the following description, statements such as "top and bottom", "front and back," or "left and right" refer to the operative position or orientation of a household device, for example of a stove or a dishwasher.

Figure 1:
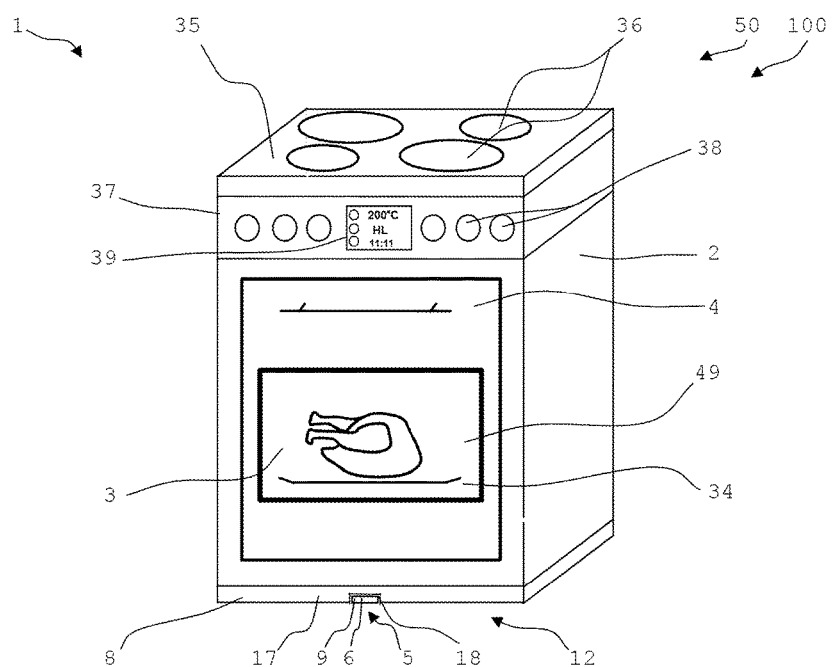
FIG. 1 shows a highly schematic depiction of a household appliance according to the present invention in slightly perspective view.

FIG. 1 shows a highly schematic perspective view of a household appliance 1 according to the present invention. The household appliance 1 is a cooking device 50, which is designed as a stove 100 in the example depicted. The cooking device 50 has a housing 2, on which a treatment chamber 3 is disposed that can be closed off by a door 4. In the cooking device shown here, the treatment chamber 3 is a cooking chamber 34 which can be heated by at least one heat source. Top/bottom heat, convection, hot-air operation, gas operation, vapor heating, microwave operation or a combination thereof are, for example, suitable to heat the cooking chamber. Such a heat source is not further depicted here.

A stove top 35 containing several cooking zones is arranged on the top of the cooking device 50. Furthermore, a control panel 37 is provided, which can comprise several control elements 38 and e.g. also a display 39.

A viewing window 49 is provided in the door 4, through which viewing window 49 a user can look into the cooking chamber 34 in order to control the cooking process without having to open the door 4.

The cooking device 50 is firmly connected to the installation location 12 and in particular firmly connected to the fastening device of the installation location using a securing device 5. The securing device 5 comprises a first fastening device 6 and a second fastening device 7. FIG. 1 only shows a small part of the first fastening device 6.

The securing device 5 is provided in the bottom section 8 of the housing 2. The end of the first fastening device 6 is visible in the opening 18, which is provided in the front wall of the device 17 on the housing 2 at the bottom.

Figure 2:
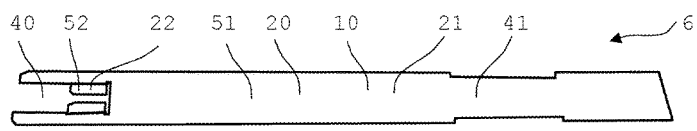
FIG. 2 shows a highly schematic depiction of a first fastening device.
Figure 3:
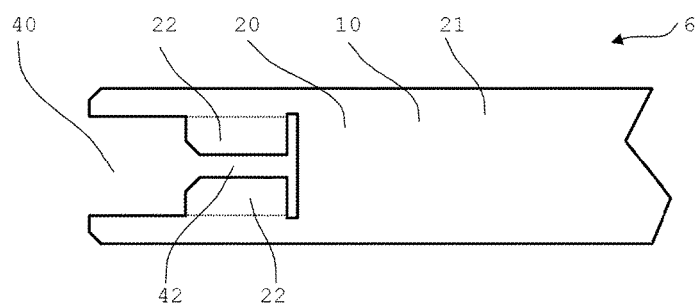
FIG. 3 shows an enlarged depiction of the fastening device of FIG. 2.

FIG. 2 shows a highly schematic representation of the fastening device 6. In the exemplary embodiment shown here, the first fastening device 6 comprises a first holding element 10 which is designed as a clamping element 20. In the exemplary embodiment shown here, the first holding element 10 is provided by a clamping plate 21 which is made of a metal-plate strip 51, the clamping element 20 shown here having been stamped from a larger metal-plate strip.

A free section 40 can be seen on the left side of the first holding element 10, which free section 40 was also produced by means of a stamping process. Two projections 52 are provided on the free section 40, which in this case are produced as tabs 22. The tabs 22 can establish an operative connection to the second fastening device 7. A narrowing 41 is provided on the left side of the clamping element 10, which can interact with a corresponding guide 23 on the housing 2.

An enlarged representation of the first holding element 10 is shown in FIG. 2, this representation also being purely schematic and highly simplified.

In this figure, the free section 40 with both tabs 22 is shown enlarged. Both tabs 22 and also the remaining geometry of this region were produced by a stamping process. Other methods can, of course, also be used advantageously in order to produce the desired first holding element 10. Here the first holding element 10 is later introduced into the housing 2 such that the stamping burr points upward. As a result of the stamping process, both tabs 22 are slightly oriented upward, whereby an especially effective connection or canting with the second fastening device can be accomplished. If, for manufacturing reasons, both tabs 22 cannot be provided slightly inclined at the first holding element 10, the tabs 22 can also be bent slightly upward manually or with a machine.

In this way, a slot 42 is created between both tabs, where the size of the slot 42 can be defined by the size or shape of the tabs 22 and by the angle of inclination of the tabs 22.

FIGS. 4 and 5 are a purely schematic and highly simplified representation of the interaction between the first and the second fastening device 6, 7. In FIG. 4, the second fastening device 7, which is designed as a second holding element 11 in the exemplary embodiment shown here, can be seen. The second holding element 11 consists of a threaded rod 30, which, in the exemplary embodiment shown here, has a screw aid 32 in the form of a nut 43 in an approximately central position. Screw aids 32 of a different configuration can also be used advantageously. For example, a correspondingly configured opening for accommodating a tool can also be provided in the top region of the second holding element.

The thread of the threaded rod 30 runs in opposite directions above the screw aid and below the screw aid. Other second holding elements 11 can also be used advantageously for fastening the cooking device to the floor 12. By way of example, a rod 28 with locking devices 29 and also regular threaded bolts 31 can advantageously be used.

In FIG. 4, the first fastening device 6 or the first holding element 10 are pushed onto the second fastening device 7. The second holding element 11 is located in the slot 42 of the first holding element 11 and held by the slightly inclined tabs 22 of the first holding element 10. Owing to the tabs 22 that are slightly oriented upward, the connection between the first fastening device 6 and the second fastening device 7 is still reinforced in case the cooking device tilts, whereby the cooking device 50 can still better be prevented from tilting.

FIG. 5 shows a purely schematic and highly simplified lateral view of a securing device 5. In this case, the second fastening device 7 is screwed into the floor 12. In the exemplary embodiment shown here, a dowel is used as a connection between the installation location 12 and in particular between the floor of the installation location 12 and the second fastening device 7. The fastening device 7 designed as a second holding element 11 was, in this case, screwed into the floor 12 using the screw aid 32.

This figure also shows a first holding element 10 of the first fastening device 6 placed on top of the second fastening device 7. The tabs 22 slightly pointing upward, which connect to the second fastening device 7 more firmly if a force acts on the cooking device 50, can easily be seen. This is due to the fact that the tabs 22 press slightly downward when the first holding element 10 moves slightly upward, as a result of which the slot gets smaller. In this way, an increasingly firmer connection between the first and the second fastening device 6, 7 is accomplished.

In FIG. 6, a highly schematic slightly perspective view of the bottom section 8 of the housing of the household appliance 1 is shown. This bottom section 8 can, for example, directly contact the installation location 12 and in particular the floor of the installation location 12, or also stand on the floor 12 by means of, for example, small legs. The bottom section 8 of the housing 2 has a bottom 13, a rear wall 16, a front wall 45 and two lateral walls 46. An opening 18 is arranged slightly centrally in the front wall of the device 17, through which opening 18 the first fastening device 6 is inserted into the housing 2. When only one securing device 5, which is shown in the present example, is used, the central arrangement is advantageous. When several securing devices 5 are used, other positions can also be advantageous. An opening 14 is provided at the bottom 13 of the housing 2 through which opening 14 the second fastening device 7 can engage in the housing 2.

In the exemplary embodiment shown here, an opening 15 is also provided in the rear wall 16 of the housing 2 so that the household appliance 1 need not be placed on the second fastening device 7 in a slightly tilted state. This opening 15 is connected to the opening 14. The connection between the opening 14 and the opening 15 is at least in part and also at least temporarily provided. In this way, the household appliance 1 can simply be pushed to the desired position. In this connection, the second fastening device 7 can get into the opening 15 in the rear wall 16 of the housing 2 in the bottom 13 of the housing 2.

The exact position of the second fastening device 7 on the floor 12 was, in this case, previously determined by means of a template 33. Such a template can consist of e.g. cardboard and represent an image of the bottom section 8 or of the bottom plate 13 of the housing 2 of the household appliance 1.

In order to secure the household appliance 1 as well as possible against tilting or tipping over the second fastening device 7 is provided as close as possible to the rear wall 16 in the exemplary embodiment shown here. Owing to such an arrangement of the second fastening device 7, the securing device 5 can absorb substantially larger forces than if the second fastening device 7 was provided e.g. close to the front wall 45. In general, it is preferred that the second fastening device 7 is provided on the rear half 24. But the second fastening device 7 is especially preferably provided in the rear third 25 or in the rear quarter 26 of the housing 2 of the household appliance 1.

In FIG. 7, the bottom section 8 of the housing 2 of the household appliance 1 is shown according to the representation in FIG. 6. In this representation, the first fastening device 6 is inserted through the opening 18 at the front section 18 [sic] into the housing 2 in the holding device 9 provided for this purpose. In the exemplary embodiment shown here, the holding device 9 is substantially provided by the opening 18.

The clamping element 10 of the first fastening device 6 is led through the opening 18 from the front and along the bottom 13 of the housing 2 up to the second fastening device 7. The first holding element 10 is then finally pushed onto the second fastening device 7 in order to accomplish a tilt-proof connection between the first fastening device 6 and the second fastening device 7. As the second fastening device 7 is provided close to the rear wall 16 of the housing 2 in the exemplary embodiment shown here, the first holding element 10 extends over a substantial part of the depth 19 of the bottom 13 of the housing 2.

During the insertion, the first holding element 10 is located in guides 23 attached to the bottom 13 of the housing 2. As a result, an aligned guidance of the first holding element 10 relative to the second fastening device 7, which is designed as a second holding element 11, is accomplished.

In other designs the first holding element 10 can also be already inserted into the bottom section 8 of the housing during the final assembly of the household appliance 1. The first holding element 10 can then, for example, be designed such that at least one guide 23 prevents the complete removal of the first holding element 10 from the housing 2. The first holding element 10, however, can also be at least pushed forward and backward through the opening 18 in the direction indicated as an arrow, until a connection and release of the first and second fastening device 6, 7 are possible.

FIG. 8 is a purely schematic and simplified representation of a template 33, with which the correct position can be determined on the floor 12 for the second fastening device 7. In the exemplary embodiment shown here, this template 33 consists of a piece of cardboard 48 which represents the width 27 and the depth 19 of the housing 2. The template 33 can be placed in the desired position of the household appliance 1. The correct position of the second fastening device 7 is marked with a cross on the cardboard 48. This position can then be transferred to the floor 12. At this point, a hole is then drilled into the floor of the installation location 12 in which the second fastening device 7 is accommodated, for example, by using a dowel 44.

Figures 9A, 9B:
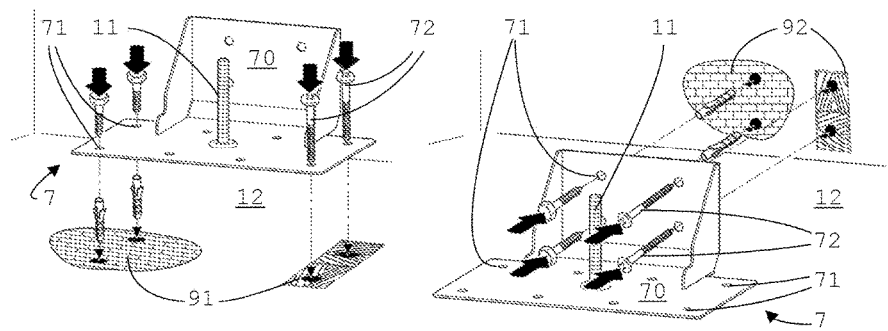
FIG. 9a shows a schematic depiction of a second fastening device with a fastening unit, here on fixation on the floor of the installation location.
FIG. 9b shows a schematic depiction of a second fastening device with a fastening unit, here on fixation on a wall of the installation location.

FIGS. 9a and 9b schematically show a second fastening device 7 with a fastening unit 70, wherein the fastening unit of FIG. 9a is used for the fixation of the fastening device 7 to the floor 91 of the desired installation location 12, whereas it is used for the fixation on a wall 92 of the installation location in FIG. 9b.

Here the fastening unit 70 is configured as a metal-plate angle, on which the second holding element 11, which is configured as a threaded rod in this case, is arranged such that it extends essentially vertically to the floor 91 of the installation location 12, or vertically to the floor 91. Furthermore, the fastening unit 70 designed as a metal-plate angle has several through openings 71 configured on each leg of the metal-plate angle.

Depending on the condition of the floor 91 or of the wall 92, suitable fastening devices like screws for e.g. wooden or stone floors, or wooden or stone walls, can be used in order to fixate the fastening device to the installation location by inserting the screws 72 through the through openings 71 and screwing them into the floor 91 or into the wall 92. Due to the fastening unit 70, the fastening device 7 can be easily fixated to any installation location because reacting flexibly to the respective circumstances is basically possible.

Figure 10:
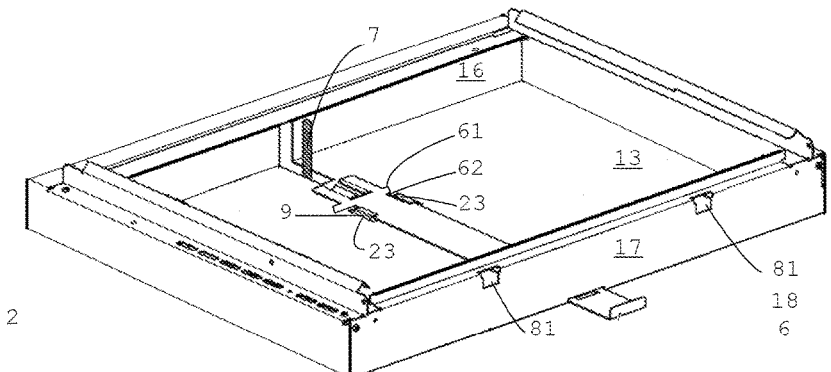
FIG. 10 shows a highly schematic depiction of the bottom section of a housing of a household appliance according to the present invention, wherein a second fastening device engages in the housing, and the first fastening device still protrudes over the front wall of the housing.
Figure 11:
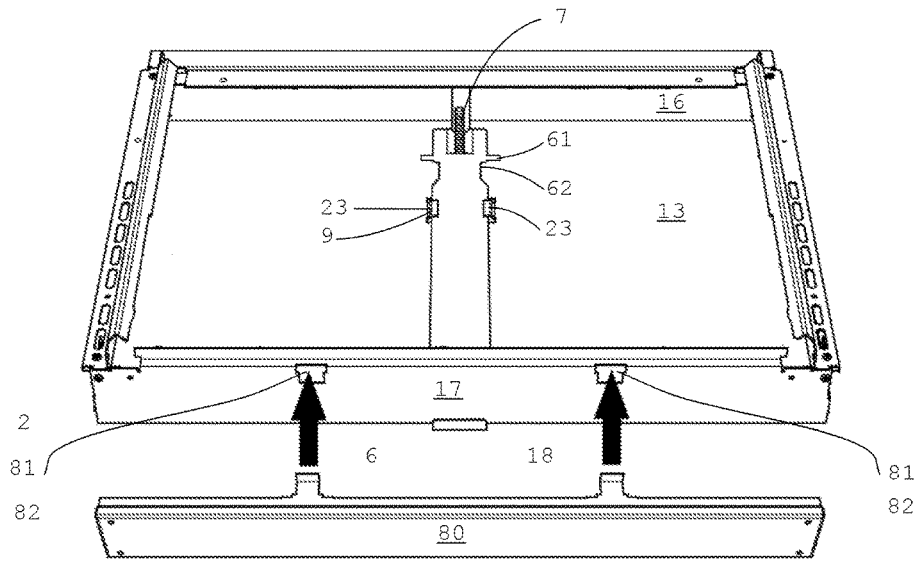
FIG. 11 shows the bottom section of a housing according to FIG. 10, wherein the first fastening device is inserted until it no longer protrudes from the front wall of the housing so that a panel can be attached to the front wall of the housing.

FIGS. 10 and 11 show a highly schematic representation of the bottom section 8 of the housing 2 of a household appliance 1 according to the present invention. The embodiment shown here essentially corresponds to the embodiment shown in FIGS. 6 and 7. In FIGS. 10 and 11, however, the front wall 17 of the housing 2 has two holding devices 81 in the form of recesses which are provided and configured to accommodate two holding devices 82 of a panel and in particular a base cover 80. The base cover 80 is, in this case, used as a cladding for the front housing wall 17 and is in particular intended to cover the opening 18 and the first fastening device 6. Here the base cover 80 can only be attached to the front wall of the housing 17 when the first fastening device 6 has been inserted into the housing 2 of the household appliance 1 until it no longer protrudes through the opening 18 on the front wall 17. By inserting the first fastening device 6 in the direction of the rear wall 16 of the housing 1 it achieves operative connection to the second fastening device 7, as a result of which the household appliance 1 is secured against tilting. The base cover 80 can then only be attached when the first and second fastening device 6, 7 are in operative connection with one another and the household appliance 1 is secured against tilting. A fastening device still protruding from the opening of the housing on the front wall 17 would, in contrast, not allow attaching the base cover 80.

Furthermore, it is apparent from FIGS. 10 and 11 that a holding device 9 with two guides 23 is provided for the first fastening device. During the insertion of the guides 23, the first fastening device 6 is accommodated by the guides 23 which are attached to the bottom 13 of the housing 2. As a result, an aligned movement of the first fastening device 6 relative to the second fastening device 7 is accomplished. Furthermore, the first fastening device 6 has two projections 61 and two recesses 62 which interact with the holding device 9 and in particular with the guides 23 in order to guide the first fastening device 6 such that it can only be moved over a defined distance, namely as far as a connection and release of the first and second fastening device 6, 7 are possible. A complete removal of the first fastening device from the housing 2 is, however, prevented by the projections 61 which abut on the guides 23.

It is furthermore within the scope of ability of a person skilled in the art to modify the described exemplary embodiments in a manner not shown here in order to attain the described effects without abandoning the principles of the invention.

| Reference numerals | |
|---|---|
| 1 | household appliance |
| 2 | housing |
| 3 | treatment chamber |
| 4 | door |
| 5 | securing device |
| 6 | first fastening device |
| 7 | second fastening device |
| 8 | bottom section |
| 9 | holding device |
| 10 | first holding element |
| 11 | second holding element |
| 12 | installation location |
| 13 | bottom |
| 14, 15 | opening |
| 16 | rear wall |
| 17 | front wall |
| 18 | opening |
| 19 | depth |
| 20 | clamping element |
| 21 | clamping sheet |
| 22 | tab |
| 23 | guide |
| 24 | half |
| 25 | third |
| 26 | quarter |
| 27 | width |
| 28 | rod |
| 29 | locking device |
| 30 | threaded rod |
| 31 | threaded bolt |
| 32 | screw aid |
| 33 | template |
| 34 | cooking chamber |
| 35 | stove top |
| 36 | cooking zone |
| 37 | control panel |
| 38 | control element |
| 39 | display device |
| 40 | free section |
| 41 | narrowing |
| 42 | slot |
| 43 | nut |
| 44 | dowel |
| 45 | front wall |
| 46 | lateral wall |
| 47 | rear section |
| 48 | cardboard |
| 49 | viewing window |
| 50 | cooking device |
| 51 | metal-plate strip |
| 52 | projection |
| 61 | projection |
| 62 | recess |
| 70 | fastening unit |
| 71 | through-opening |
| 72 | fastening device, screw |
| 80 | base cover |
| 81 | fist holding device |
| 82 | second holding device |
| 91 | floor |
| 92 | wall |
| 100 | stove |

What is claimed is:

1. A household appliance (1) comprising:
a housing (2),
a treatment chamber (3), a door (4) closing off the treatment chamber (3), and
a securing arrangement (5), the securing arrangement (5) including a first fastening device (6) and a second fastening device (7), the first fastening device having a first holding element (10) provided in a bottom section (8) of the housing (2), the bottom section including a bottom (13) of the housing, and the second fastening device (7) having a second holding element (11) configured to be fixedly fastened to an installation location (12) for positioning the housing (2), the first fastening device (6) and the second fastening device (7) being suitable for and configured to establish an operative connection with one another by coupling the first holding element (10) to the second holding element (11),
wherein a holding device (9) is associated with the first fastening device (6) on the housing (2), the holding device (9) including a guide arrangement (23) for the first fastening device (6) for placing the first fastening device (6) into operative connection with the second fastening device (7) while the housing (2) of the household appliance in the installation location (12).

2. The household appliance (1) according to claim 1, further comprising an opening (18) at a front wall (17) of the household appliance in a bottom section (8) of the housing (2), the opening (18) configured for introducing the first fastening device (6) into the housing (2).

3. The household appliance (1) according to claim 2, wherein an opening (14, 15) is provided at the housing which is suitable for and configured to allow the second fastening device (7) to at least partly engage in the housing (2).

4. The household appliance (1) according to claim 3, wherein the opening consists of at least two interconnected openings (14, 15), of which a first opening (14) is located in the bottom (13) of the housing and a second opening (15) is located in a rear wall (16) of the housing, the first and second openings (14, 15) forming a joint inlet opening in an edge section between the bottom of the housing (13) and the rear wall (16) of the housing.

5. A household appliance (1) comprising:
a housing (2),
a treatment chamber (3),
a door (4) closing off the treatment chamber (3), and
a securing arrangement (5), the securing arrangement (5) including a first fastening device (6) and a second fastening device (7), the first fastening device having a first holding element (10) provided in a bottom section (8) of the housing (2), the bottom section including a bottom (13) of the housing, and the second fastening device (7) having a second holding element (11) configured to be firmly connected to an installation location (12) for positioning the housing (2), the first fastening device (6) and the second fastening device (7) being suitable for and configured to establish an operative connection with one another by coupling the first holding element (10) to the second holding element (11), wherein a holding device (9) is associated with the first fastening device (6) on the housing (2), the holding device (9) including a guide arrangement (23) for the first fastening device (6) for placing the first fastening device (6) into operative connection with the second fastening device (7) while the housing (2) of the household appliance in the installation location (12), wherein in an installed state, the first holding element (10) rests at least in sections on the bottom (13) of the housing (2).

6. The household appliance (1) according to claim 1, wherein the first holding element (10) extends across the bottom (13) of the housing (2) over more than half of a depth defined by a distance between a front wall and a rear wall of the housing.

7. The household appliance (1) according to claim 1, wherein the first holding element (10) comprises a clamping element (20) being a clamping sheet (21).

8. The household appliance (1) according to claim 1, wherein the first holding element (10) has a projection (52) for engaging the second fastening device (7).

9. The household appliance (1) according to claim 8, wherein the projection is a tab (22).

10. The household appliance (1) according to claim 9, wherein the tab (22) has an upward slope toward the second fastening device (7) in an installed state of the first holding element (10).

11. The household appliance (1) according to claim 1, wherein the housing has a front wall and a rear wall and wherein the first holding element (10) of the first fastening device (6) and the second holding element (11) of the second fastening device (7) are positioned closer to the rear wall than to the front wall in an installed state.

12. The household appliance (1) according to claim 11, wherein the first holding element (10) and the second holding element (11) are located at least twice as far from the front wall as from the rear wall in the installed state.

13. The household appliance (1) according to claim 1, wherein the securing arrangement (5) is provided at half width (27) of the housing (3).

14. The household appliance (1) according to claim 1, wherein the second holding element (11) of the fastening device (7) includes a rod (28) with locking devices (29).

15. The household appliance according to claim 14, wherein the rod (28) is a threaded rod (30) or as a threaded bolt (31).

16. The household appliance according to claim 15, further including a screw aid (32) on the second fastening device (7) or on the second holding element (11).

17. The household appliance (1) according to claim 1, further including an attached template (33) in order to indicate a desired position for the second fastening device (7) relative to the installation location (12).

18. A method for a tilt-proof fastening of a household appliance (1) to an installation location (12) wherein the household appliance (1) has a housing (2) and a securing arrangement (5), wherein the securing arrangement (5) has a first fastening device (6) and a second fastening device (7), the method comprising the following method steps:
fastening the second fastening device (7) to a predefined point at the installation location (12);
subsequently placing the household appliance (1) in the installation location (12); and
subsequently moving the first fastening device (6) relative to the second fastening device (7) until a first holding element (10) of the first fastening device (6) and a second holding element (11) of the second fastening device (7) engage one another, thereby establishing an operative connection between the first fastening device (6) and the second fastening device (7).

19. The method of claim 18, wherein the step of fastening the second fastening device is carried out according to a template (33) specifying a location for the second fastening device relative to the installation location (12).

* * * * *